No. 855,979. PATENTED JUNE 4, 1907.
T. W. RAZOUX.
ATTACHMENT FOR BICYCLES AND MOTOR CYCLES.
APPLICATION FILED MAY 5, 1906.
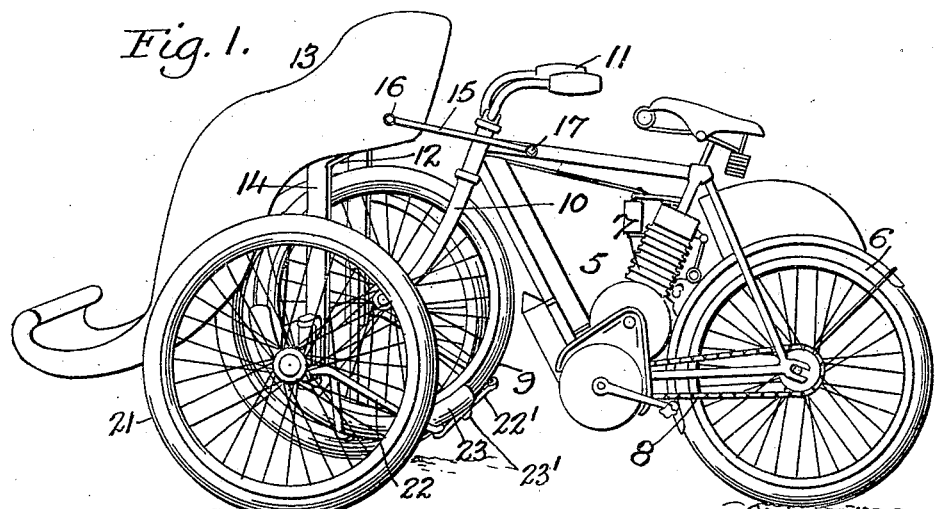
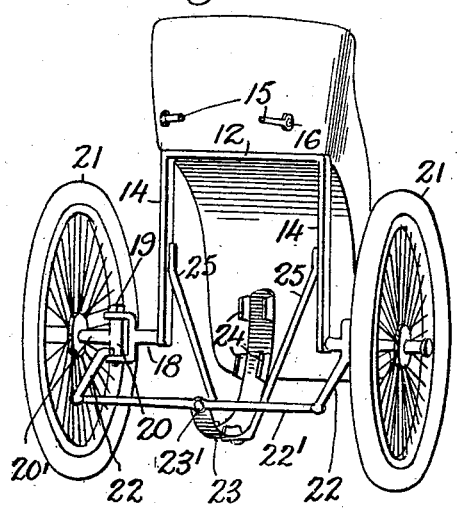
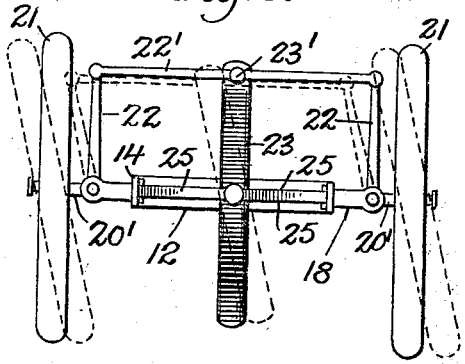
WITNESSES
James F. Duhamel
7C. Allen.
INVENTOR
Theodore W. Razoux,
BY
Victor J. Evans.
ATTORNEY.

UNITED STATES PATENT OFFICE.

THEODORE W. RAZOUX, OF BROOKLYN, NEW YORK.

ATTACHMENT FOR BICYCLES AND MOTOR-CYCLES.

No. 855,979.      Specification of Letters Patent.      Patented June 4, 1907.

Application filed May 5, 1906. Serial No. 315,368.

*To all whom it may concern:*

Be it known that I, THEODORE W. RAZOUX, a citizen of the United States, residing at Brooklyn, in the county of Kings and State of New York, have invented new and useful Improvements in Attachments for Bicycles and Motor-Cycles, of which the following is a specification.

My invention relates to bicycles or motor-cycles and more particularly for attachments adapted to carry an additional seat for another passenger or passengers and which may be readily attached or detached without a loss of time. These and other features and details of the invention are more fully described in the following specification and pointed out in the appended claims.

In the drawings forming part of this application and accompanying same, like reference characters are used to designate the same parts of my device in the various figures.

Figure 1 is a side view of a motorcycle provided with the attachment. Fig. 2 is a rear view of the attachment. Fig. 3 is a bottom view of the attachment removed from the motorcycle.

The motorcycle 5 shown in this instance, may be of any desired construction or may be simply a bicycle. The rear wheel 6 of the machine is adapted to run along the ground and be driven by the motor 7 by means of a belt or chain 8. The front wheel 9 is journaled in the fork 10 as usual and steered by means of the handle-bar 11.

The attachment consists of a horizontal frame 12 carrying the seat 13 of any desired size or shape and this frame 12 is secured to an upright frame 14 having at its top, brace-rods 15 with eyes for the reception of bolts or screws 16 at one end and the other end of these rods has similar eyes to receive attached bolts 17 which secure the rods to the top bar or frame of the motorcycle.

The two lower ends of the frame 14 are bent at right angles 18 and to the same is pivoted by means of the bolts 19, steering knuckles 20 carrying studs 20′, on the outer ends of which are journaled the wheels 21. The lower sides of these steering knuckles carry arms 22 to which are pivoted the cross-bar 22′. The steering knuckles are thus free to swing so that the course of the wheels may be changed and the bar 22′ causes these steering knuckles to move in unison. To the cross-bar 22′ by means of a bolt 23′, is pivoted a semi-circular frame 23 the said frame having lugs 24 on its sides, and it is pivotally braced to the sides of the frame 14 by means of rods 25.

The device is attached to the bicycle or motorcycle by simply inserting the front wheel into the frame 23 where the lugs 24 secure the same against lateral derangement and the bolts 17 are then put in position and properly adjusted so as to hold and brace the frame 14 rigidly. The device is quickly and easily removed by simply reversing the above operation.

It will be seen that when the handle-bar 11 is used to readily change the course of the wheel 9, the frame 23, and the cross-bar 23′ and the steering knuckles 20 are easily turned on their pivots, causing the wheels 21 to move with the wheel 9 in whatever direction it is desired to move the machine and its attachment.

While the above construction is simple and substantial, various modifications may suggest themselves and be resorted to without departing from the essential features above described. This construction need not be limited to a seat for passengers only but for receptacles for mailing matter or merchandise could be arranged on such a frame and the machine utilized for messenger or express purposes. The frame may be also made of any special size for the accommodation for heavier or lighter loads.

Having thus described my invention what I claim as new is:—

1. In an attachment for bicycles and motorcycles, the combination with a frame carrying one or more seats, of means for supporting and carrying a wheel of the machine and means for bracing the attachment to the frame of the machine.

2. In an attachment for bicycles and motorcycles, the combination with a frame carrying seats, of means for suspending and holding the front wheel of the machine in said frame and means for rigidly connecting the frame to the machine.

3. In an attachment for bicycles and motorcycles, the combination with a frame having a seat and rigidly braced to the frame of the bicycle, of braces, pivoted axle studs, means for carrying the front wheel of the bicycle and means connecting the front wheel with the pivoted axle studs.

4. In an attachment for bicycles and motorcycles, the combination with a frame rigidly braced to the bicycle, of a frame adapted to carry the front wheel of the bicycle and pivoted in the first frame, pivoted studs for the wheels carried by the first frame and connected with the pivoted frame so that they will turn in unison with the front wheel of said bicycle.

5. An attachment for bicycles, comprising a seat carrying frame connected with the bicycle and mounted upon a wheel, and means connected with the handle bars of the bicycle for directing said wheel.

6. An attachment for bicycles, comprising a seat carrying frame having connection with the bicycle, a wheel journaled upon the frame, means carried by the frame and adapted to receive and support the steering wheel of the bicycle, and a connection between said means and the wheel of the frame, whereby the wheel of the frame may be directed from the handle bars of the bicycle.

7. An attachment for bicycles, comprising a seat carrying frame, wheels journaled upon the frame, means carried by the frame and adapted to receive and support the steering wheel of the bicycle, and connection between the wheels and said means, whereby the wheels of the frame may be directed from the handle bars of the bicycle.

8. An attachment for bicycles, comprising a seat carrying frame, a wheel journaled upon the frame, and means carried by the frame for the reception of the front wheel of a bicycle.

In testimony whereof, I affix my signature in presence of two witnesses.

THEODORE W. RAZOUX.

Witnesses:
　JAMES F. DUHAMEL,
　MAE W. CLINTON.